Aug. 15, 1939.  F. J. TOBIAS  2,169,303
PROCESS AND APPARATUS FOR PRODUCING FILAMENTS
Filed Sept. 4, 1936
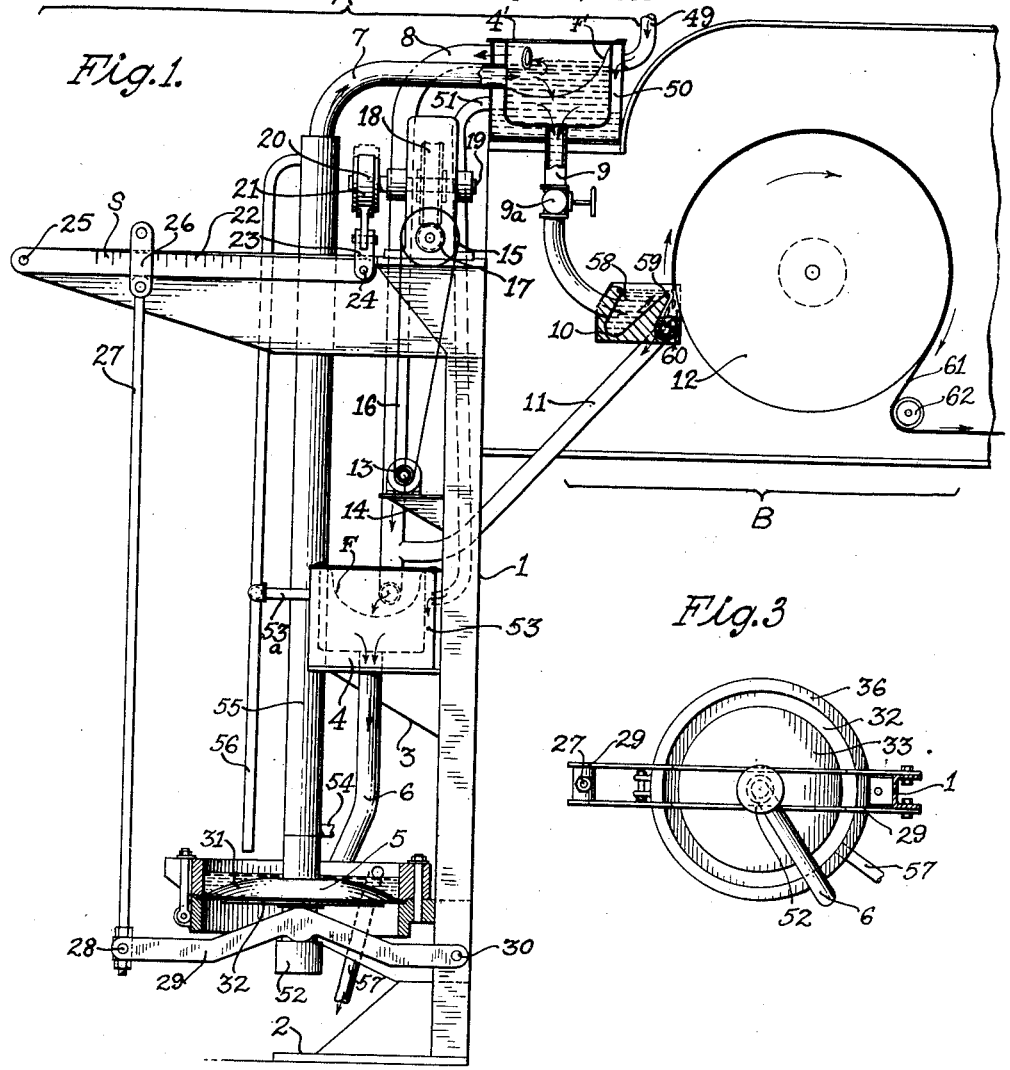
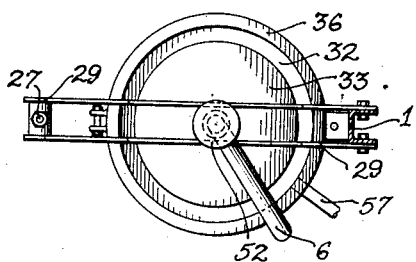
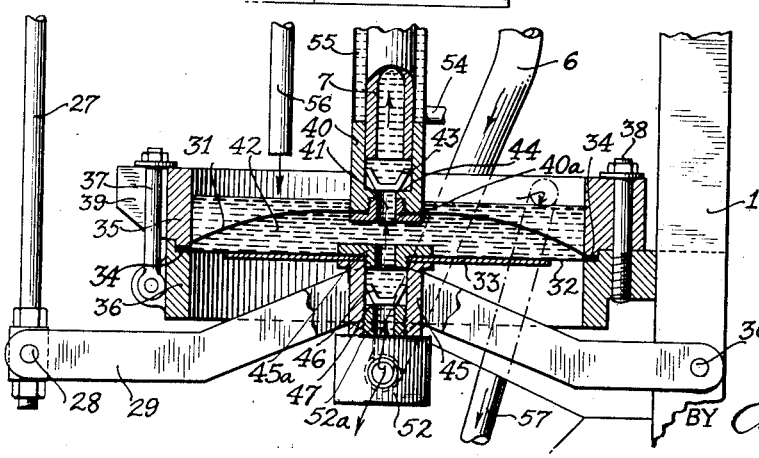
INVENTOR.
FRED J. TOBIAS
BY Mock & Blum
ATTORNEYS.

Patented Aug. 15, 1939

2,169,303

UNITED STATES PATENT OFFICE 2,169,303

PROCESS AND APPARATUS FOR PRODUCING FILAMENTS

Fred J. Tobias, Allentown, Pa., assignor, by mesne assignments, to Filatex Corporation, New York, N. Y., a corporation of New Jersey Application September 4, 1936, Serial No. 99,354

6 Claims. (Cl. 18—8)

The invention relates in general to rubber filaments and, in particular, to a process and apparatus for producing elastic rubber filaments and to correlated improvements in a circulatory system therefor.

In the preparation of elastic rubber filaments from a rubber-containing liquid, it is necessary to maintain a uniform and constant flow of the liquid to the filament-forming means to avoid irregularity of diameter and interruption of the process. For example, in forming a filament by picking up latex on a member moving in contact with a flowing layer of latex, it is important that the layer has a constant velocity of flow and a uniformity of thickness. Otherwise the filaments picked up will be non-uniform in diameter and in other properties.

Further, in forming rubber filaments by an extrusion process, it is necessary to maintain a constant head of latex whether the extrusion is effected by gravity alone or with the aid of an external compressive force.

In pumping a heat-unstable liquid such as latex, it is important that no heat be caused to develop by friction or from other sources. Further, it is essential to prevent extraneous substances such as lubricating oils and the like from mixing with the latex during circulation.

Therefore, it is a general object of the present invention to provide a process and apparatus for the production of rubber filaments of uniform diameter in a continuous manner.

It is a specific object of the present invention to provide in a rubber filament-forming apparatus, means for effecting the uniform and constant flow of a rubber-containing liquid to the filament-forming device therein.

It is a further specific object of the invention to provide in a rubber filament-forming apparatus, a circulatory system which will deliver a layer of latex having a uniform velocity and thickness.

It is another object of the invention to provide in a rubber filament-forming apparatus, a circulatory system in which no heat is developed during circulation and which is sealed to prevent the admittance of extraneous substances such as lubricants and the like.

Other objects of the invention will in part be obvious and will in part appear hereinafter.

According to the present invention, rubber filaments having uniform diameters are prepared by collecting latex upon the surface of a filament-forming member moving in contact with a layer of latex, circulating the latex through an endless path passing in contact with the filament-forming member, positively producing a pulsating current of latex in one part of the path, changing the pulsating current of latex to a constant current of latex by feeding the pulsating current into a pool of latex and causing the latex to flow by gravity from the pool to the point of contact with the filament-forming member. The apparatus of the invention comprises, in combination, a filament-forming device, preferably a heated endless member adapted to form a filament by contacting a layer of latex, means to maintain a layer of latex in contact with the endless member and a latex circulatory system including a head for flowing the latex by gravity into contact with the endless member and a diaphragm pump for restoring the unused latex to the head.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawing, in which:

Fig. 1 illustrates, partly in section, the circulatory system of the invention in combination with one embodiment of a filament-forming device;

Fig. 2 is an enlarged cross-sectional view of the diaphragm pump shown in Fig. 1; and Fig. 3 is a bottom plan view of the pump of the apparatus of Fig. 1.

Referring to Fig. 1, there is shown a fluid circulatory system A in combination with a filament-forming unit B. The circulatory system A comprises a frame structure 1 having a base portion 2 and a bracket 3 upon which is mounted a fluid container 4 connected to a diaphragm pump 5 by means of a flexible conduit 6, preferably made of rubber. The fluid from the pump 5 is discharged through a conduit 7 to a reservoir 4'. Connected with the reservoir 4' is a conduit 8 which communicates with container 4 and provides an overflow for the reservoir 4' to maintain a specified level therein. A flexible conduit 9 having a valve 9a is provided between the reservoir 4' and the box or container 10 of the filament-forming unit B. To complete the cycle, a flexible conduit 11 is provided between the box 10 and the container 4. Suitable filters F and F', such as cheesecloth or the like, may be provided in the vessels 4 and 4' respectively for straining the fluid passing therethrough.

It can be seen from this structure that the fluid in the original container 4, flows downwardly by gravity into the diaphragm pump 5 and is caused to flow up to the reservoir 4' where a constant level is maintained by the return flow conduit 8. From the reservoir 4', the fluid flows by gravity through the conduit 9 into the box 10 whereupon the fluid is picked up by a filament-forming device 12. The overflow in the box 10 is returned by gravity to the container 4.

The diaphragm pump 5 is actuated by a motor 13 mounted on a bracket 14 which in turn drives a pulley 15 through a belt or a chain 16. The pulley 15 is connected to and drives the worm 17 which in turn causes rotation of the gear 18 mounted on a shaft 19 which is provided with a cam 20. The cam 20, upon rotation, causes oscillation of the element 21 mounted thereon. The element 21 is connected to a lever 22 by means of a shackle 23 having a pivot 24. On the lever 22, which is pivotally mounted at the point 25, there is mounted a shackle 26 which is connected to one end of a rod 27. Pivotally mounted at 28 at the other end of the rod 27, there are connected two parallel levers 29, one positioned on each side of an element 52 which will be described later, as shown in Fig. 3, the levers 29 being affixed at the pivot point 30 on the frame 1. The levers 29 are bent upwardly at their center portion to contact a diaphragm 32 of the pump which will be described later.

To operate this pump-actuating system, the motor 1 drives the worm 17 which in turn rotates the gear 18 causing the cam 20 to oscillate the lever 22 which imparts a reciprocal motion to the rod 27 which transfers this motion to the diaphragm 32 of the pump 5.

In Fig. 2 there is shown an enlarged cross-section and in Fig. 3 a bottom plan of the diaphragm pump which comprises a dome shaped head 31 of rigid stainless steel and a circular diaphragm 32 of flexible stainless steel which is reenforced by a rigid metal disc 33. The peripheries of the elements 31 and 32, having a gasket 34 therebetween, are clamped together by means of rings 35 and 36, the latter of which is fixed upon the frame 1. The rings 35 and 36 are clamped together by means of bolts 37 and 38, the former being pivotally mounted on the ring 36 and adapted to swing into clamping engagement between two lugs 39 projecting laterally from the ring 35. A cylinder 40 is fixed at the center of the dome-shaped head 31 by a bushing 40a and communicates through the aperture 41 to the space 42 within the pump. A valve 43 is positioned on a valve seat 44 within the cylinder 40. A cylinder 45 which is similar to cylinder 40 is clamped to the center of the flexible diaphragm 32 and its reenforcing disc 33 by means of a bushing 45a and communicates with the interior space 42 of the pump. A valve 46 is positioned on a valve seat 47 within the cylinder 45. To the lower end of cylinder 45 is affixed a hollow head 52 which has a threaded neck 52a making liquid-tight connection with the cylinder 45. The conduit 6 is connected to the lower portion of the head 52 at 52a and thus communicates through cylinder 45 with the interior space 42.

In the operation of the diaphragm pump, the levers 29 are caused to oscillate and on their upward motion the diaphragm 32 is moved upwardly to decrease the volume of the space 42. During an upward stroke, the valve 46 remains fixed against its seat 47, thus allowing no fluid to back into the conduit 6. The valve 43 is lifted and the fluid caused to flow into the conduit 7. On the downward motion of the levers 29, the valve 43 is forced down against its seat, thereby preventing the fluid from flowing back into the space 42. During such downward stroke, the valve 46 moves upwardly permitting the fluid in the conduit 6 to flow into the space 42. During the operation of the pump, the head provided in the container 4 causes the fluid to flow into the space 42 which has been partially evacuated during the downward stroke of the levers 29. The lever 22 may have a scale S marked thereon so that the length of the stroke of the pump may be readily adjusted and set to give the desired rate of flow.

The circulatory system is provided with means for cooling the filament-forming fluid with water, the water flowing through a conduit 49 into an outer jacket 50 surrounding the reservoir 4'. From this jacket, the water flows through a conduit 51 into a cooling jacket 53 surrounding the container 4, the water being drained therefrom through a conduit 53a. Cooling fluid is passed through a pipe 54 to a jacket 55 surrounding the conduit 7. A conduit 56, attached to the upper portion of the jacket 55, is provided to cause the cooling fluid to be returned to the upper portion of the diaphragm pump 5 from which it is drained by means of the pipe 57. From this structure, it may be seen that the fluid circulated in the system is cooled at appropriate intervals throughout the circulatory system which is quite essential in handling heat-unstable fluids. The box 10 may be provided with a suitable cooling system (not shown).

The unit B may comprise a filament-forming device of the type disclosed in either of the pending Spencer applications, Serial Nos. 737,898 and 17,465. Essentially the unit B comprises a filament-forming member 12 which picks up fluid from the box 10. Fluid flows from the reservoir 4' through the valve 9a which controls the rate of flow into a well 58 and over a weir 59 in the form of a layer. The device 12 picks up part of the flowing layer, the balance of which enters the overflow chamber 60 and thence back through conduit 11 to the container 4. The fluid picked up on the device 12 is coagulated to form a filament 61 which is stripped from the device 12 by a roller 62 and passed through a dusting box (not shown) and wound upon a suitable swift (not shown) in the usual manner. If desired, fluid boxes other than the type shown may be employed and any suitable number of boxes may be used for each filament-forming member.

The fluid from which the rubber filaments are made may contain any suitable form of rubber such as a natural or artificial dispersion or a solution of a natural or synthetic rubber or any appropriate mixture of the above. It is preferred to employ a natural rubber dispersion, such as latex, containing suitable fillers, coloring matter, vulcanizing agents, accelerators and heat-sensitizers. Any suitable fluid having the desired temperature may be employed in the cooling system such, for example, as water, brine, etc. The parts of the apparatus which are normally exposed to the rubber-containing fluid may be composed of stainless steel, chromium, glass or any suitable non-corrosive material.

A diaphragm pump is particularly advantageous for use in the circulatory system of the invention because the displacement and movement of the diaphragm is small, so that substantially no heat is generated which would tend to cause coagulation of the latex within the pump and change its viscosity. Moreover, there is no frictional movement of the parts which are in direct contact with the latex so that one avoids coagulation of the latex by friction as would occur in the case of a piston pump. There are no liquid seals in the diaphragm pump so that the latex is not contaminated by oils or other extraneous materials whereby the viscosity of the latex remains substantially constant in flow throughout the diaphragm pump.

Since certain changes in carrying out the above process and in the constructions set forth, which embody the invention, may be made without departing from its scope, it is intended that all matter contained in the above description or shown in the accompanying drawing shall be interpreted as illustrative and not in a limiting sense.

Having described my invention, what I claim as new and desire to secure by Letters Patent is:

1. In an apparatus for forming rubber filaments by collecting latex on the surface of a heated endless member moving in contact with a layer of latex, a latex circulatory system comprising a latex reservoir, a second latex reservoir positioned above said first reservoir, a latex container having a weir positioned intermediate said reservoirs, and a diaphragm pump for lifting latex from the first reservoir to the second whereby the latex flows by gravity to said container.

2. In a process for forming rubber filaments, the steps comprising collecting latex upon the surface of a heated endless filament-forming member moving in contact with a body of latex, maintaining a body of latex in contact with said member, producing a uniform flow of latex in said body by gravity from a pool of latex positioned higher than said body and returning the unused latex from said body to the pool by means of a pulsating current.

3. In a process for forming rubber filaments in which a mass of latex is circulated through an endless path passing in contact with a filament-forming member, the steps comprising circulating a body of latex by means of a pulsating current, and changing said pulsating current to a continuous unidirectional current by feeding the pulsating current into a large pool of latex and causing the latex to flow by gravity from said pool in contact with said filament forming member.

4. In a process for forming rubber filaments in which a mass of latex is circulated through an endless path passing in contact with a filament-forming device, positively producing a pulsating current in one part of said path, feeding latex by said pulsating current to a pool of latex and causing latex to flow by gravity from said pool to the filament-forming device.

5. In an apparatus for forming rubber filaments, a latex container having a weir, a filament-forming device located and having means to form a filament by contact with the latex flowing over said weir, said container being connected to a first latex reservoir which is located above said latex container, said latex container being connected to said first latex reservoir so that latex flows under gravity from said first latex reservoir to said latex container, a diaphragm pump having its outlet connected to said first latex reservoir, a second latex reservoir connected to the inlet of said pump, level-controlling means operative to remove latex in said first latex reservoir above a predetermined level thereof and to transfer said removed latex to said second latex reservoir, means connecting said latex container with the second latex reservoir and adapted to transfer the latex which has flowed over said weir to said second latex reservoir.

6. In an apparatus for forming rubber filaments, a latex container having a weir, a filament-forming device located and having means to form a filament by contact with the latex flowing over said weir, said container being connected to a first latex reservoir which is located above said latex container, said latex container being connected to said first latex reservoir so that latex flows under gravity from said first latex reservoir to said latex container, a diaphragm pump having its outlet connected to said first latex reservoir, a second latex reservoir connected to the inlet of said pump, level-controlling means operative to remove latex in said first latex reservoir above a predetermined level and to transfer said latex to said second latex reservoir, means connecting said latex container with the second latex reservoir and adapted to transfer the latex which has flowed over said weir to said second latex reservoir, the first latex reservoir being located above the second latex reservoir, said level-controlling means comprising an overflow pipe having one end thereof in communication with the first latex reservoir and having its other end in communication with the second latex reservoir.

FRED J. TOBIAS.